Sept. 30, 1941.   E. J. COOK   2,257,673
REPRODUCING MACHINE
Filed Aug. 4, 1939   7 Sheets-Sheet 1

INVENTOR.
Everett J. Cook
BY
Whittemore Hulbert & Belknap
ATTORNEYS

INVENTOR.
Everett J. Cook

Sept. 30, 1941.　　　　E. J. COOK　　　　2,257,673
REPRODUCING MACHINE
Filed Aug. 4, 1939　　　　7 Sheets-Sheet 3

INVENTOR.
Everett J. Cook
BY
ATTORNEYS

INVENTOR.
Everett J. Cook
BY
ATTORNEYS

Sept. 30, 1941. E. J. COOK 2,257,673
REPRODUCING MACHINE
Filed Aug. 4, 1939    7 Sheets-Sheet 5
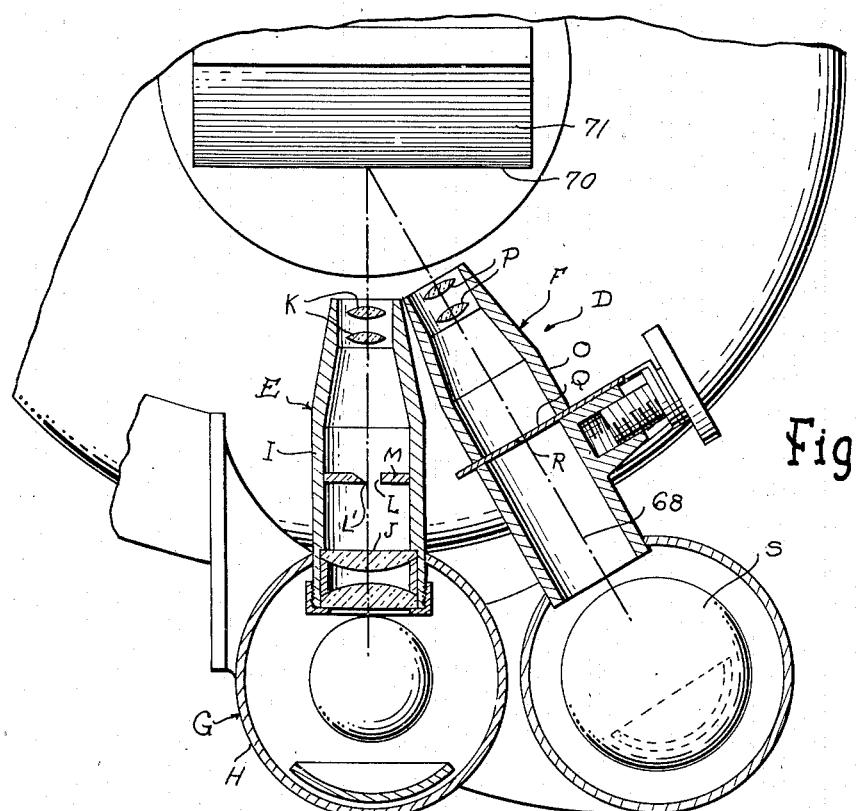
Fig. 7.
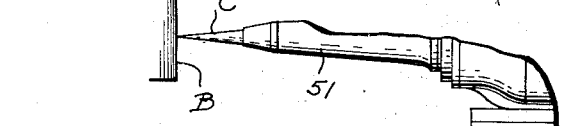
Fig. 6.
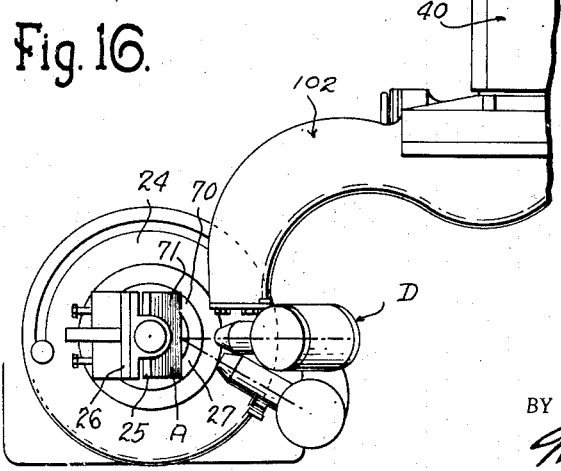
Fig. 16.
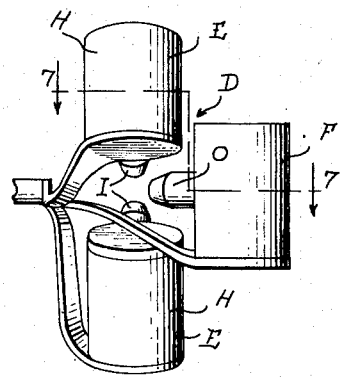
INVENTOR.
Everett J. Cook
BY
ATTORNEYS Sept. 30, 1941.  E. J. COOK  2,257,673
REPRODUCING MACHINE
Filed Aug. 4, 1939  7 Sheets-Sheet 6

INVENTOR.
Everett J. Cook
BY
ATTORNEYS

Sept. 30, 1941.   E. J. COOK   2,257,673
REPRODUCING MACHINE
Filed Aug. 4, 1939   7 Sheets-Sheet 7

INVENTOR.
Everett J. Cook
BY
Whittemore, Hulbert & Belknap
ATTORNEYS

Patented Sept. 30, 1941

2,257,673

UNITED STATES PATENT OFFICE 2,257,673

REPRODUCING MACHINE

Everett J. Cook, Toledo, Ohio, assignor to H. H. Buggie & Company, Toledo, Ohio, a corporation of Ohio Application August 4, 1939, Serial No. 288,436

19 Claims. (Cl. 90—13.5)

This invention relates generally to reproducing machines of the type wherein relative movement of a tool and a work blank is effected by driving means controlled by an optical unit scanning a surface of a model to be reproduced in the work blank.

More particularly, the present invention relates to a reproducing machine wherein relative movement between the tool and work is controlled by an optical unit comprising a projector and a light sensitive cell device secured on a common support with the projector in predetermined angular relationship with respect to the latter. In systems of the general type previously referred to, the projector casts an illuminated image on the model surface to be duplicated having a sharply defined contour line reflected from the model surface on an apertured plate shielding the light sensitive cell. The image is reflected on the plate with the contour line thereof intersecting or straddling the aperture through the plate and, of course, the contour line changes as the shape of the model surface changes. As a result, the flux of radiant energy escaping through the aperture depends upon the shape of the contour line and when this flux exceeds a predetermined value, relative movement between the pattern and optical unit is effected in one direction until the flux escaping through the aperture diminishes to such an extent as to either stop the relative movement in the aforesaid direction, or to effect relative movement in the opposite direction. In other words, the model and optical unit are relatively moved toward and away from each other in dependence upon variations in contour of the model surface scanned to maintain the aperture in intersecting relationship with the contour line throughout the scanning operation. It follows from the above that identical or proportional relative movements may be effected between the work and tool by merely establishing a connection between either of the latter and the moving device controlled by the light sensitive cell.

With the above in view, the present invention contemplates improving generally the accuracy of machines of the character previously set forth, particularly when these machines are relied upon to reproduce irregular surfaces and, in general, this is accomplished in the present instance by providing an arrangement wherein both the optical system and tool may be adjusted to assume different angular positions with respect to the model and work. As a result, the image may be projected on the model surface substantially normal to the latter and the tool may assume the same relative position with respect to the corresponding surface of the work. This feature is of particular importance in cases where the light sensitive cell is controlled, in effect, by a contour line representing a section of the model surface viewed from the position of the cell because it eliminates the inaccuracy resulting from distortion of the image caused by the angularity or curvature of the model surface scanned.

Another object of this invention consists in the provision of a machine of the type set forth in the preceding paragraph wherein both the tool and optical unit are carried by a reciprocable ram supported for swinging movement in a vertical plane relative to the work and model to locate the tool and optical unit in different angular positions with respect to the work and model.

Still another object of this invention consists in mounting the ram on a reciprocable traversing carriage and in providing means for swinging the ram relative to the carriage predetermined increments at the end of each traversing stroke of the carriage.

A further advantageous feature of this invention resides in the provision of a reproducing machine rendering it possible to form a cavity in the work blank with a surface corresponding to the surface of the model or to reproduce an exact replica of the surface in the work blank.

The foregoing, as well as other objects, will be made more apparent as this description proceeds, especially when considered in connection with the accompanying drawings, wherein:

Figure 6 is an enlarged elevational view of the optical system employed in the reproducing machine forming the subject matter of this invention;

Figure 7 is a sectional view taken substantially on the plane indicated by the line 7—7 of Figure 6;

Figure 16 is a fragmentary plan view of still another embodiment of this invention.

Upon reference to Figures 1 to 13, inclusive, it will be noted that my improved reproducing machine comprises a pedestal 20 having a carriage 21 mounted on one side of the pedestal for vertical sliding movement relative to the pedestal and having a traversing carriage 22 mounted on the top of the carriage 21 for reciprocation in a substantially horizontal plane. The carriage 21 is moved upwardly relative to the pedestal 20 predetermined increments of travel and is lowered from its uppermost position at a relatively fast rate by mechanism forming no part of the present invention. However, the above movement of the carriage 21 and the desired traversing movement of the carriage 22 may be effected by means clearly shown in my Patent No. 2,154,974, dated April 18, 1939.

Figure 1:
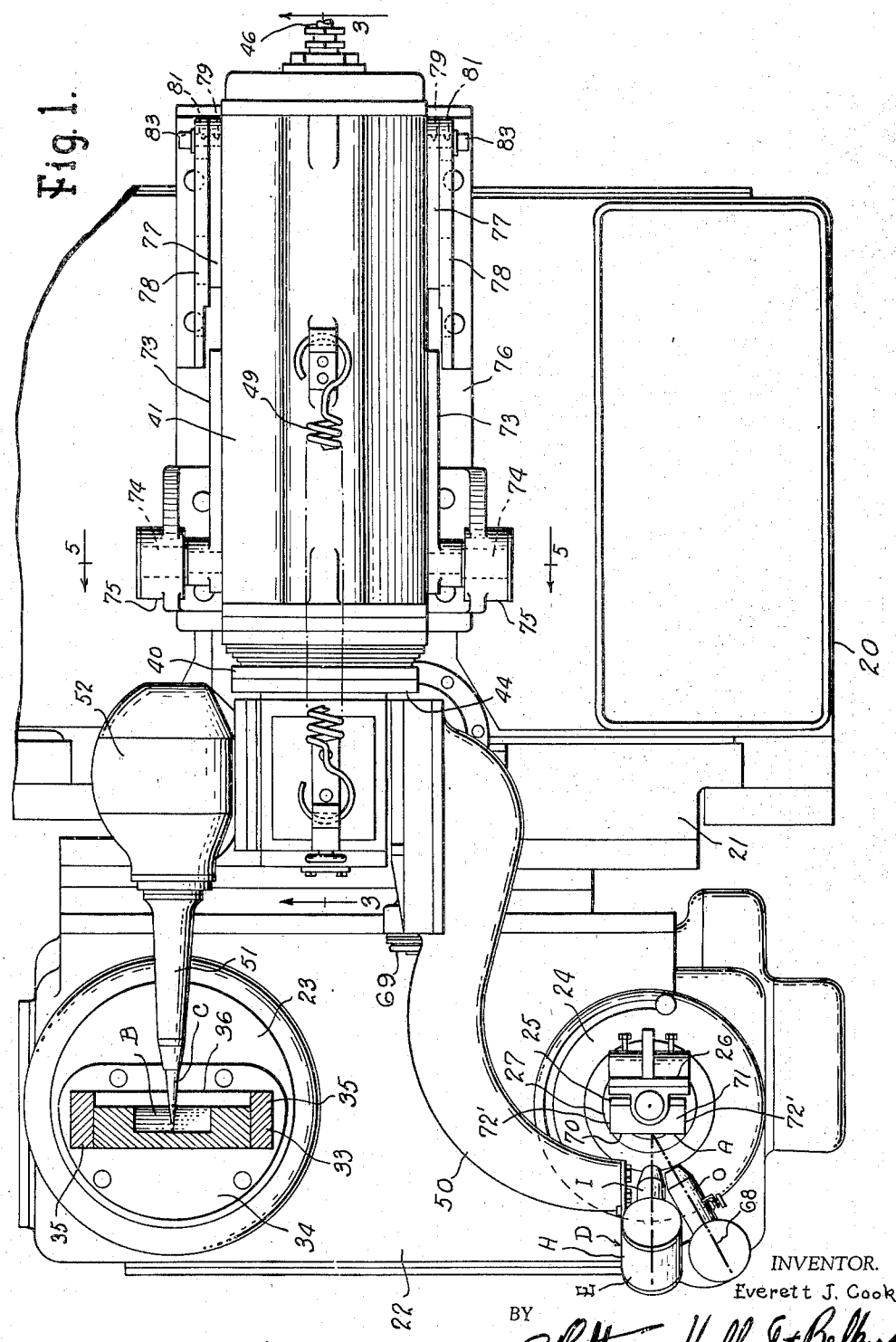
Figure 1 is a plan view of the reproducing machine embodying the present invention.
Figures 2, 8:
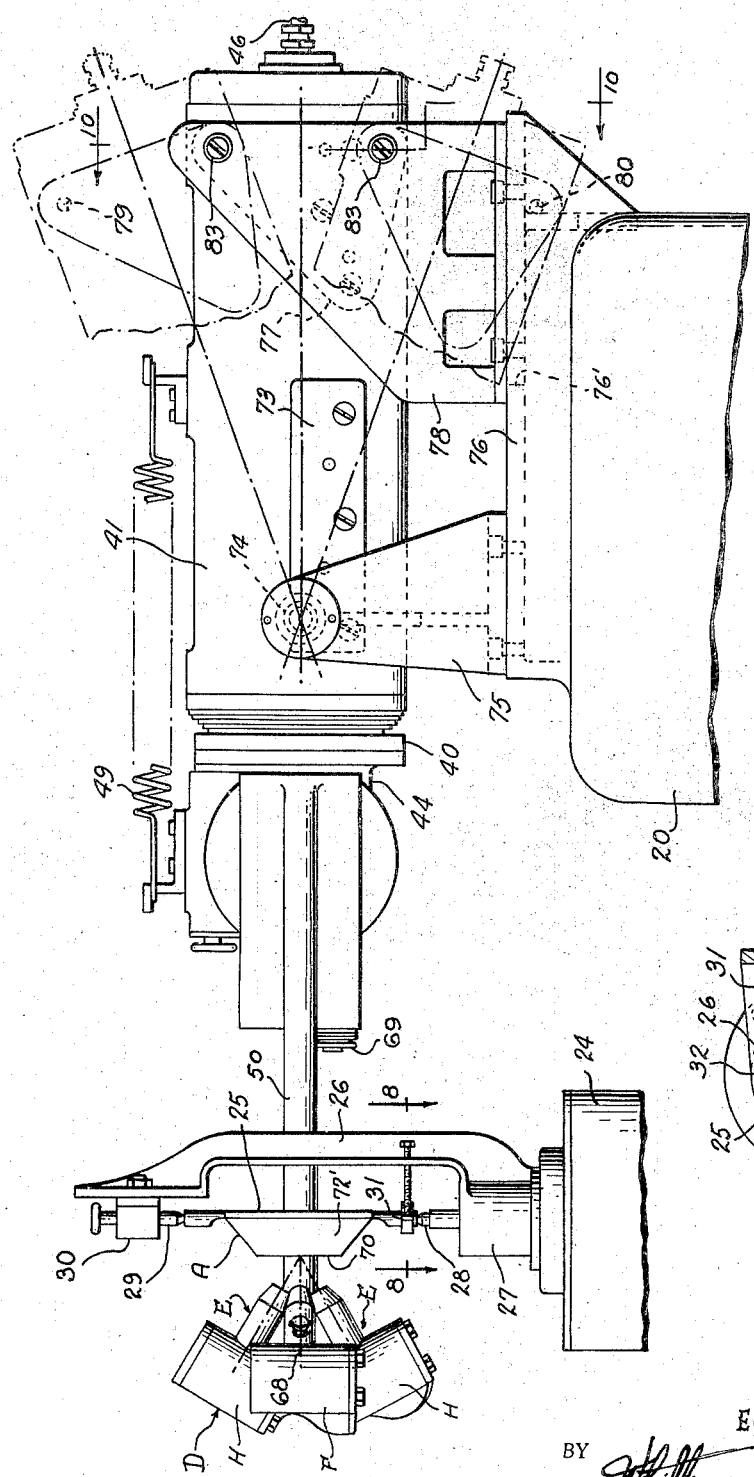
Figure 2 is a side elevational view of the machine shown in Figure 1.
Figure 8 is a section taken on the line 8—8 of Figure 2.

Mounted upon the carriage 22 in side by side relationship is a support 23 for a work blank B and a support 24 for a pattern A. The pattern A is preferably formed of or coated with a good light reflecting material and is shown in Figure 2 as secured to one side of a holder 25 which, in turn, is mounted on a fixture 26 having a base portion 27 suitably secured to the model support 24. In the present instance, opposite ends of the holder are engaged with the centering pins 28 and 29 to permit rotative adjustment of the model A relative to the fixture 26. The upper pin 29 is threadedly mounted in a bushing 30 carried by the fixture 26 and the arrangement is such as to permit the holder 25 to be readily assembled and removed from the fixture. The holder 25 is held against rotation on the centers by means of stops 31 adjustably mounted on the fixture 26 and having the free ends engaging shoulders 32 projecting laterally from opposite sides of the holder 25.

Figure 9:
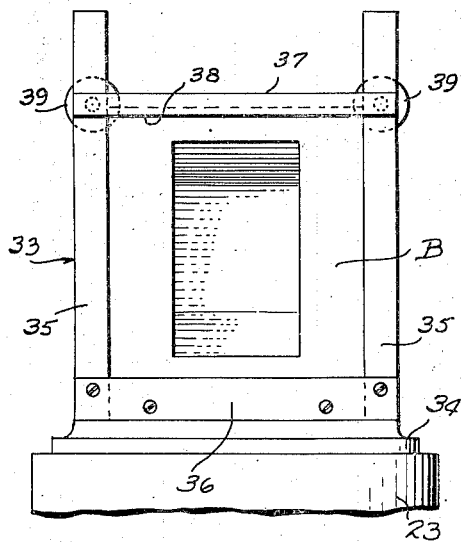
Figure 9 is an elevation of the support for the work holder.

The work blank B is mounted on a clamp 33 having a base 34 secured in any suitable manner to the support 20 and having upwardly projecting side walls 35 adapted to engage opposite sides of the work blank in the manner clearly shown in Figure 9. The lower end portions of the walls 35 are connected together by means of a cross bar 36 forming an abutment for engaging the inner side of the work blank B and the upper ends of the side walls are connected together by a bar 37 slidably supported on the side walls 35. The cross bar 37 is provided with a depending flange 38 adapted to abut the inner side of the work blank at the top of the latter to cooperate with the bar 36 in positioning the blank relative to the holder and is secured in place by means of the clamping screws 39.

In the present instance, the surface of the pattern A is scanned by an optical unit D and the latter controls the movements of a tool C positioned at the inner side of the work blank B opposite the cutting end of the tool. Both the tool C and optical unit D are mounted on the forward end of a ram 40 supported within an annular casing 41 for reciprocation toward and away from the traversing carriage 22. Upon reference to Figure 5, it will be noted that the ram is triangular in cross section and that the casing 41 is provided with side walls having portions extending parallel to the angular walls of the ram. In order to reduce friction to the minimum, suitable needle bearings 42 are arranged between the parallel walls of the casing and ram 14.

Figure 3:
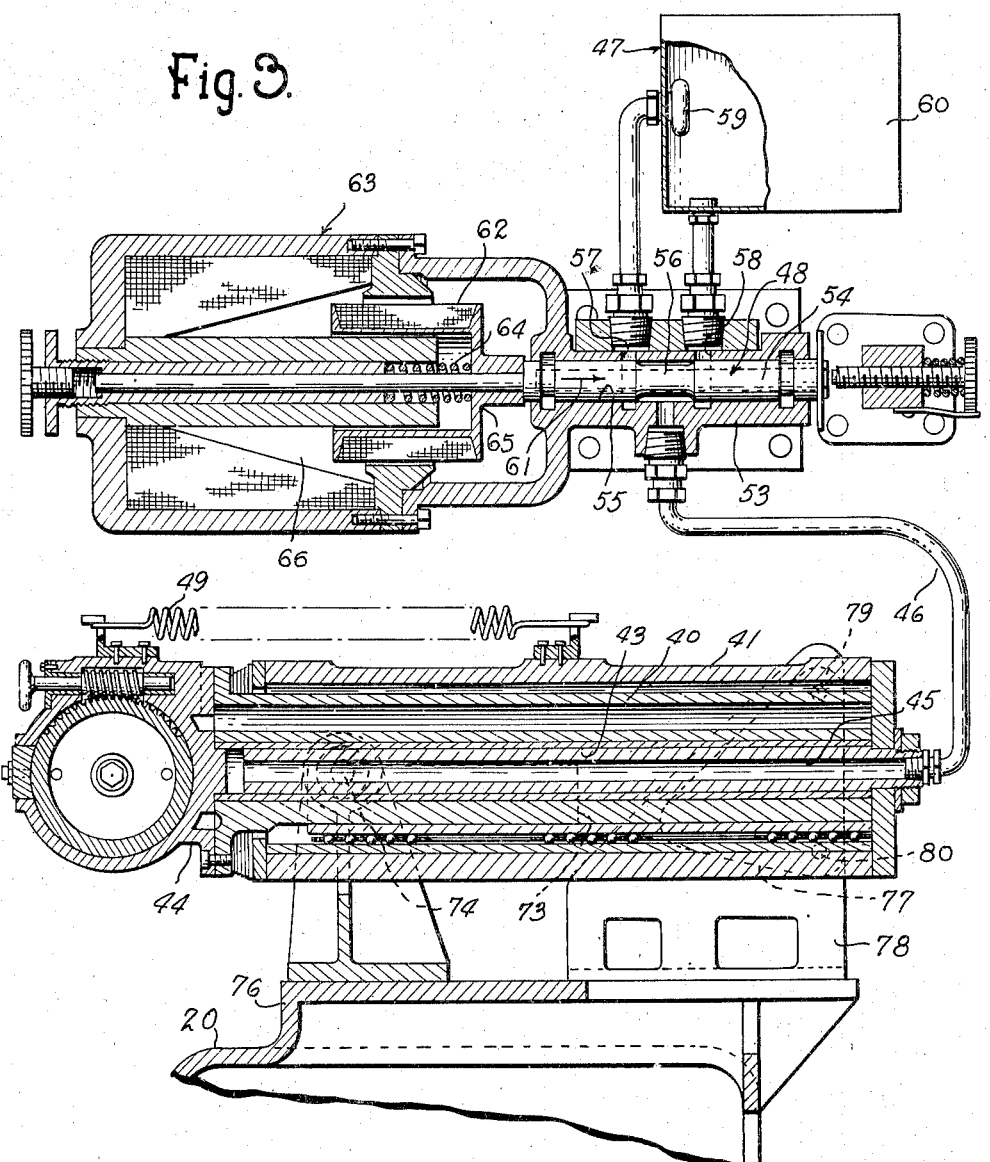
Figure 3 is a sectional view taken substantially on the plane indicated by the line 3—3 of Figure 1.

Upon reference to Figure 3, it will be noted that the ram is further provided with a cylinder 43 extending axially of the ram and secured to the head 44 of the ram for movement as a unit with the latter. The head 44 closes the inner end of the cylinder and is exposed to the discharge end of a fluid supply tube 45 having a sliding engagement with the inner wall of the cylinder and secured at the outer end thereof to the casing 41. The outer end of the tube 45 is connected to a flexible conduit 46 which, in turn, communicates with a source 47 of hydraulic fluid medium under pressure through the medium of a valve 48 to be more fully hereinafter described.

The above arrangement is such that when fluid under pressure is discharged into the outer end of the tube 45 from the source of supply, the fluid pressure reacts against the head 44 and moves the ram 40 in an inward direction toward the traversing carriage 22. This movement of the ram is effected against the action of a spring 49 having the outer end secured to the casing 41 and having the inner end secured to the head 44 of the ram. As a result, as soon as the fluid under pressure is exhausted from the interior of the cylinder 43, the spring 49 operates to return or effect outward movement of the ram.

Inasmuch as the embodiment of the invention shown in Figures 1 to 13, inclusive, relates to a machine particularly designed to cut a cavity or recess in the work blank having a surface corresponding to the surface of the model, the tool C is fed into the work by the ram 40 when the optical unit D is moved by the ram away from the pattern A. In detail, the optical unit D is positioned opposite the pattern A at the outer side of the latter on an arm 50 having the opposite end connected to one side of the inner end of the head 44 so that movement of the ram in a direction toward the carriage 22 effects a corresponding movement of the optical unit D away from the pattern A. The tool C, on the other hand, is mounted on a spindle 51 driven by an electric motor 52 secured directly to the opposite side of the head 44 on the ram so that movement of the tool C toward the work blank B. As a result, the tool C will form a recess or cavity in the adjacent side of the work blank B having a surface which corresponds exactly to the surface of the pattern scanned. It has previously been indicated that the flow of fluid pressure from the source of supply 47 to the interior of the ram cylinder 43 is controlled by a valve 48. The valve 48 is shown in Figure 3 as comprising a casing 53 and a plunger 54 slidably mounted in a bore 55 formed in the casing 53. The valve plunger 54 is formed with a reduced portion 56 intermediate the ends thereof arranged in constant communication with the rear end of the tube 45 by the flexible conduit 46 and respectively establishes communication between the tube 45 and ports 57 and 58 as the plunger 54 moves in opposite directions from the neutral position thereof shown in Figure 3. The port 57 communicates with the discharge side of a suitable pressure pump 59 located within a fluid supply tank 60 and the port 58 communicates with the interior of the supply tank 60. The arrangement is such that movement of the plunger 54 in the direction of the arrow 61 from the neutral position shown in Figure 3 establishes communication between the ram cylinder 43 and the port 58 communicating with the interior of the supply tank 60. As a result, fluid is exhausted from the ram and the latter is moved in a direction away from the traversing carriage 22 or, in other words, the tool C is withdrawn from the work and the optical unit D is moved toward the pattern A. Of course, movement of the valve plunger 54 in a direction opposite the direction of the arrow 61 establishes communication between the ram cylinder 43 and the port 57 communicating with the pump 59. As a result, fluid under pressure is built up in the ram cylinder 43 and the ram is moved by the fluid pressure against the action of the spring 49 in a direction to feed the tool C into the work B and to move the optical unit D away from the pattern A.

In the illustrated embodiment of the invention, the valve plunger 54 is moved in a direction to feed the tool C toward the work B by energizing a load coil 62 of an electromagnet 63 and is moved in the opposite direction to withdraw the tool from the work by a spring 64 acting on the armature 65 of the electromagnet to resist movement of the load coil 62 into the magnetic field designated generally by the reference character 66.

The operation of the electromagnet is controlled by the optical unit D in accordance with changes in shape of the surface of the pattern scanned. Upon reference to Figures 6 and 7, it will be noted that the optical unit D comprises a pair of light projecting devices E and a light sensitive cell F supported on the arm 50 in fixed angular relation to the projectors E. More particularly, the projectors are arranged at an angle of 30° from opposite sides of a plane including the axis of the ram and extending perpendicular to a vertical plane passing through the projectors. The light sensitive cell F, on the other hand, is supported to one side of the vertical plane passing through the projectors with its axis or optical center 68 in alignment with the axis of the ram and extending at a fixed angle with respect to the vertical plane passing through the projectors so that the optical center intersects the adjacent side of the image cast upon the pattern A by the projectors.

Figure 7A:
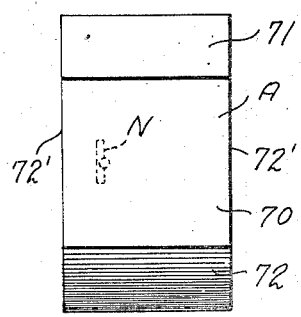
Figure 7A is a diagrammatic elevational view illustrating one surface of the model and showing the illuminated image projected on this surface.
Figure 4:
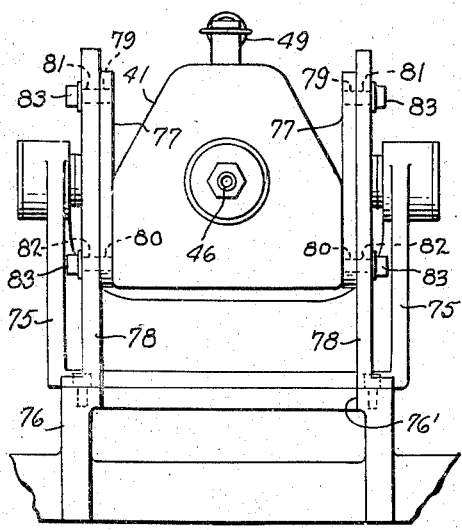
Figure 4 is an end elevational view of a portion of the machine shown in Figure 2.
Figure 5:
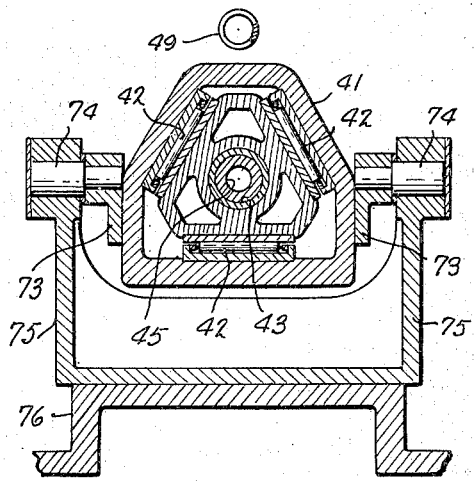
Figure 5 is a sectional view taken substantially on the plane indicated by the line 5—5 of Figure 1.
Figure 10:
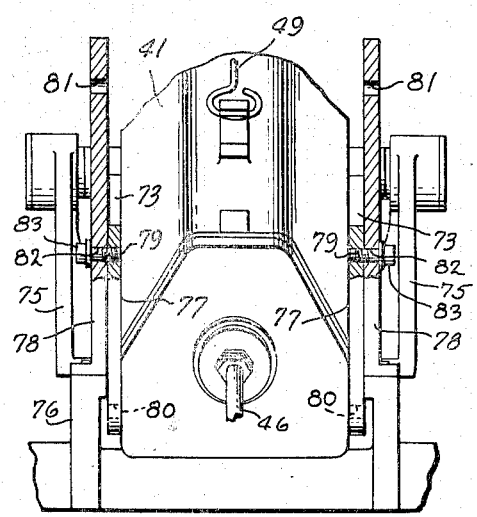
Figure 10 is a cross sectional view taken substantially on the plane indicated by the line 10—10 of Figure 2 but showing the ram in a tilted position.

Each light projector E has a source of illumination G housed by a casing H and registering with the outer end of a lens barrel I having suitable condenser lenses J secured in the outer end thereof and having objective lenses K secured in the inner end of the same. A plate or diaphragm M is located between the two lenses and is formed with a slot L therethrough of a shape predetermined to cast an illuminated image on the surface of the pattern A having a sharply defined contour line N. The shape of the image cast on the pattern surface is shown in Figure 7A and the contour line N of the image represents one section of the pattern surface as viewed from the light sensitive cell F to be more fully hereinafter described. In this connection, it will, of course, be understood that the illuminated images cast by both projectors E coincide at the surface of the pattern A so as to form, in effect, a single image on the surface of the pattern A. It may also be pointed out that by providing two projectors in the optical unit, one of the light beams will practically always be at such an angle to the surface as to provide a sharply defined contour line on the surface irrespective of the curvatures or irregularities in the pattern surface. In addition, the provision of two projectors permits successful operation of the machine even though one of the light sources in one of the projectors should become inoperative for one reason or another.

The photoelectric cell device F is also provided with a lens barrel O supported on the arm 50 with its axis arranged in the manner previously set forth and having objective lenses P fixed in the inner end thereof. The axis of the lens barrel O is designated in Figure 7 by the broken line 68 and, as stated above, intersects the illuminated image cast by the projectors on the surface of the pattern for reasons to be more fully hereinafter set forth. In addition, the photoelectric cell F is provided with a light sensitive cell in the form of an electron emissive type of tube S supported in a suitable light tight casing joined with the outer end of the lens barrel O to receive light passing through the latter. In this connection, it will be noted from Figure 7 that a plate Q is secured in the lens barrel O between the lenses P and the light sensitive cell S. This plate Q is provided with a restricted aperture R therethrough located substantially on the axis 68 of the lens barrel O and constitutes the only escape for radiant energy into the light sensitive cell casing.

It has also been stated above that the light sensitive cell F is supported on the arm 50 in fixed angular relationship to the vertical plane passing through the projectors. The above angle is so determined that when the tool is properly set with reference to the work blank B, the aperture R through the plate Q straddles the contour line N of the image reflected from this pattern surface on the plate Q. The manner in which the tool C is initially set with reference to the work blank B to effect the desired depth of cut in the work blank in response to the operation of the optical system forms no part of the present invention and, in general, is effected by adjusting the arm 50 with reference to the head 44 of the ram. A screw 69 is provided for the above purpose and the manner in which this screw effects the desired adjustment of the optical system to properly set the tool with reference to the work blank is clearly described in my copending application Serial No. 261,607, filed: March 13, 1939.

Reference has been made above to the fact that the two projectors are each provided with a plate having a slot L therethrough for the passage of radiant eneregy or light emitting from the light bulbs G. The shape of the image cast on the pattern surface depends upon the shape of the slots L and it is important to note that these slots are formed in the plates M in such a manner that the left-hand edge L' of each slot is arranged in a common vertical plane including the axes of the lens barrels I of the projectors. As a result, the lens K in the projectors cast a light image on the surface of the model with the contour line N of the image at the left-hand side of the latter. This image is, of course, reflected from the model surface and is focused by the lenses P on the plate Q, in the light sensitive cell lens barrel O, with the contour line N on the right-hand edge of the image intersecting the aperture R shown in Figure 7A by the dotted lines.

With the above in mind and remembering that the angle between the light sensitive cell and projectors remains fixed throughout the operation of the machine, it follows that as the surface of the pattern A approaches the optical unit D, the image reflected on the plate Q is shifted relative to the aperture R in a direction to increase the intensity of light passing through the aperture R to the light sensitive cell S. Such action has the effect of increasing the current flowing through the load coil 62 of the electromagnet 63 to such an extent that the valve 48 is operated to supply fluid pressure to the ram cylinder 43 and effect movement of the ram in a direction to feed the tool C into the work. It will, of course, be understood that movement of the tool C in the above direction causes a corresponding movement of the optical unit D away from the pattern, and this movement continues until the aperture R intercepts a greater area of the shaded portion of the image. As the intensity of light passing through the aperture R is decreased by interception of the aperture R with the shaded portion of the image, the quantity of current flowing through the load coil of the electromagnet 63 is correspondingly decreased, with the result that the spring 64 operates the valve 48 to permit movement of the ram 40 by the spring 49 in a direction to withdraw the tool C from the work. It follows from the above that the aperture R is maintained in straddling relationship with the contour line N, and since this contour line represents a section of the pattern as viewed from the light sensitive cell S, it also follows that an exact reproduction of the surface of the pattern scanned is produced in the work blank B.

It will, of course, be understood that the relatively weak current passing through the output circuit of the light sensitive cell in dependence upon variations in the flux of radiant energy reflected on the cell is not sufficient to operate the valve 48 to control the movement of the ram. Therefore, the relatively weak current passing through the output circuit of the light sensitive cell is amplified by an amplifier of the thermionic tube type. The amplifier forms no part of the present invention and various different types of amplifiers may be successfully used. However, particular success has been achieved by the use of an amplifier of the type shown and described in my copending application Serial No. 276,425, filed: May 29, 1939.

Figure 11:
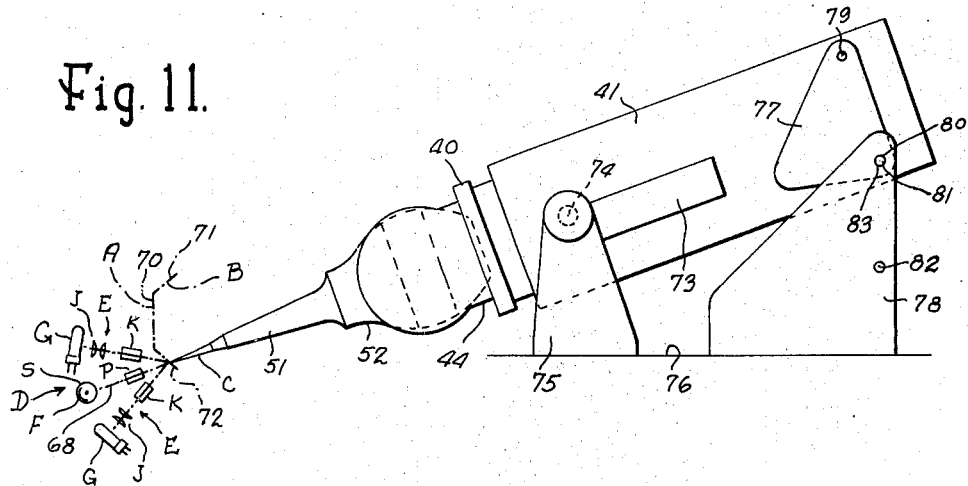
Figures 11, 12 and 13 are diagrammatic views illustrating the relative positions of the parts during operation of the machine.
Figure 12:
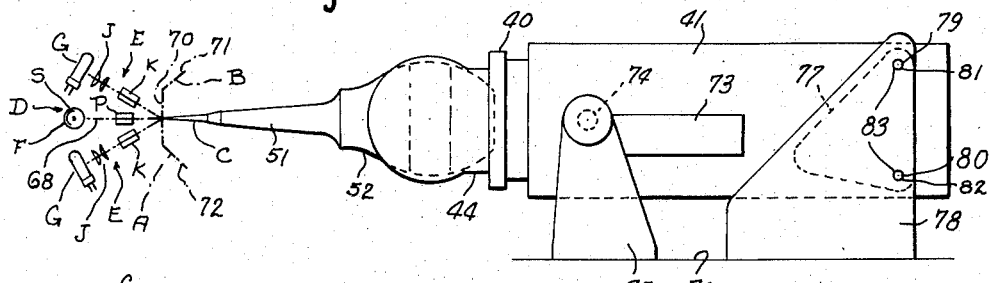
Figure 13:
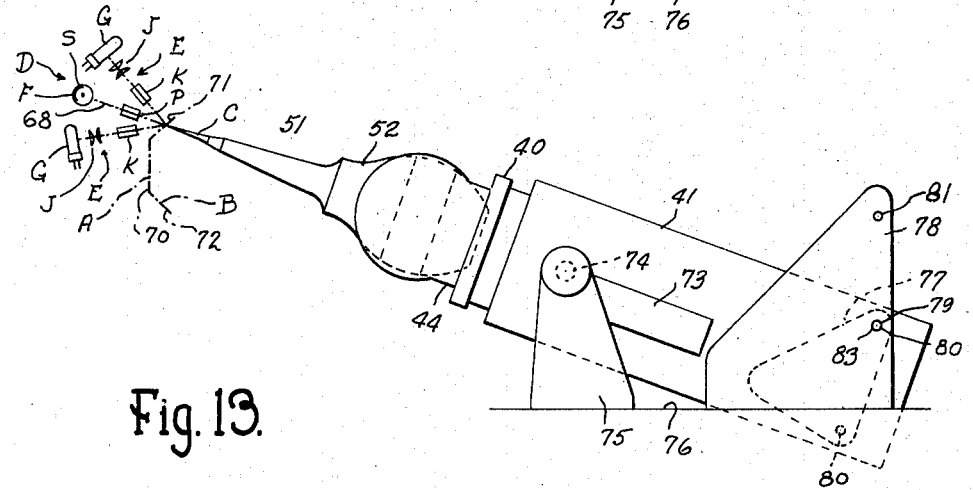

In reproducing surfaces having relatively critical irregularities with machines of the general type previously described, difficulty has been encountered in accurately scanning all portions of the surface and cutting a reproduction of the surface in the pattern B. Referring particularly to Figures 11 to 13, inclusive, it will be noted that I have illustrated a model having such an irregular surface as to present the problem of accurately duplicating the surface with a machine operating in accordance with the foregoing principles. For the purpose of illustration, I have selected a model A having a substantially flat surface 70 disposed in a vertical plane and having top and bottom angularly extending surfaces 71 and 72, respectively. The flat surface 70 may be accurately scanned and reproduced in the work blank with the axis of the ram 40 disposed in a horizontal plane. However, the angularly extending top and bottom surfaces of the model A present the problem of not only accurately scanning the same, but also of reproducing the surfaces in the work blank B by the tool C.

In accordance with the present invention, the foregoing problem is solved by supporting the ram casing on the pedestal 20 for swinging movement in a vertical plane. Before discussing in detail the mounting of the ram on the pedestal, it may be pointed out that adjustment of the ram to each of the three positions shown in Figures 11 to 13, inclusive, renders it possible to accurately reproduce the irregular surface of the pattern A in the work blank B. In Figure 11, the ram is shown as adjusted to a position wherein the bottom surface 72 of the model A may be accurately formed in the work blank B, while in Figure 13 the ram is shown in a position wherein the top surface 71 of the model A may be accurately reproduced in the work blank B, and in Figure 12 the ram is illustrated in its normal horizontal position for accurately reproducing the surface 70 of the work blank. Referring again to Figure 11, it will be noted that the ram is inclined in such a position that the beam of radiant energy cast by the lower projector E is substantially perpendicular to the bottom surface 72 and the light sensitive cell F assumes such a position that it will be effected by the flux of the radiant energy reflected from the surface 72. It will further be noted from the above figure that when the ram is inclined in the manner shown, the tool C assumes such an angle with respect to the work blank as to render it possible to accurately cut or reproduce the bottom surface 72 of the model A in the work blank. In Figure 13, the ram is swung in the opposite direction to permit scanning the top surface 71 of the model A by the uppermost projector E and to locate the tool C in an advantageous position relative to the work blank B to form a reproduction of the surface 71 in the work blank. In Figure 12, the substantially flat surface 70 is scanned and the desired results may be secured with the axis of the ram in a substantially horizontal plane. It may also be pointed out at this time that when the ram is in the position shown in Figure 11 where the bottom surface 72 is scanned by the optical unit, the carriage 22 is lowered the distance required to bring the surface 72 in position with respect to the optical unit. On the other hand, when the ram is tilted to the position shown in Figure 13, the carriage is raised to the extent required to properly locate the top surface 71 relative to the optical system.

Referring now more particularly to Figures 2 to 5, inclusive, it will be noted that plates 73 are secured to opposite sides of the ram casing 41 and each plate is provided with a laterally outwardly extending pin 74. The pins 74 are journalled in the upper ends of suitable brackets 75 having the lower ends secured to a table 76 formed on the upper end of the pedestal 20 and is cut away at 76' to provide clearance for receiving the outer end of the ram when the latter is tilted to the position shown in Figure 10. The pins 74 are, of course, in alignment with each other so as to provide for swinging the ram between the positions thereof shown in Figures 11 and 13.

A pair of plates 77 is secured to opposite sides of the ram adjacent the outer end of the latter and these plates slidably engage the laterally inner surfaces of a pair of guide plates 78 having the lower edges fixedly secured to the table 76. Upon reference to Figures 2 and 11 to 13, inclusive, it will be noted that the ram plates 77 are formed with vertically spaced openings 79 and 80 therethrough registering with corresponding openings 81 and 82 in the guide plates G when the ram is in the position thereof shown in Figure 12 for receiving suitable bolts 83. However, when the ram is tilted to the position thereof shown in Figure 11, the lowermost openings 80 in the ram plates F register with the upper openings 81 in the guide plates and when the ram is in the position thereof shown in Figures 10 and 13, the top openings 79 through the ram plates register with the lower openings 82 in the guide plates 78. The ram is secured in both of these positions by fastener elements, such as screws, extending through the aligned openings.

The foregoing arrangement will provide for satisfactorily and accurately duplicating the surfaces 71 and 72 in the work blank B. However, the same problem exists in reproducing the vertical sides 72' of the model and this problem may be readily solved by oscillating the work and pattern supports 23 and 24 about their respective vertical axes. Although various different types of mechanism may be provided for effecting oscillation of the supports, nevertheless, in the interests of simplicity, I prefer to employ the same mechanism shown and described in my Patent No. 2,154,974, dated April 18, 1939. Inasmuch as this mechanism is set forth in detail in the above identified patent, it is believed unnecessary to complicate the present disclosure with a description of the same. It will suffice to point out that the oscillatory movements of the face plates are effected simultaneously so that the sides 72' of the model and the corresponding portions of the work blank will assume the most advantageous positions with respect to the optical system and tool for effecting accurate reproduction.

Figure 14:
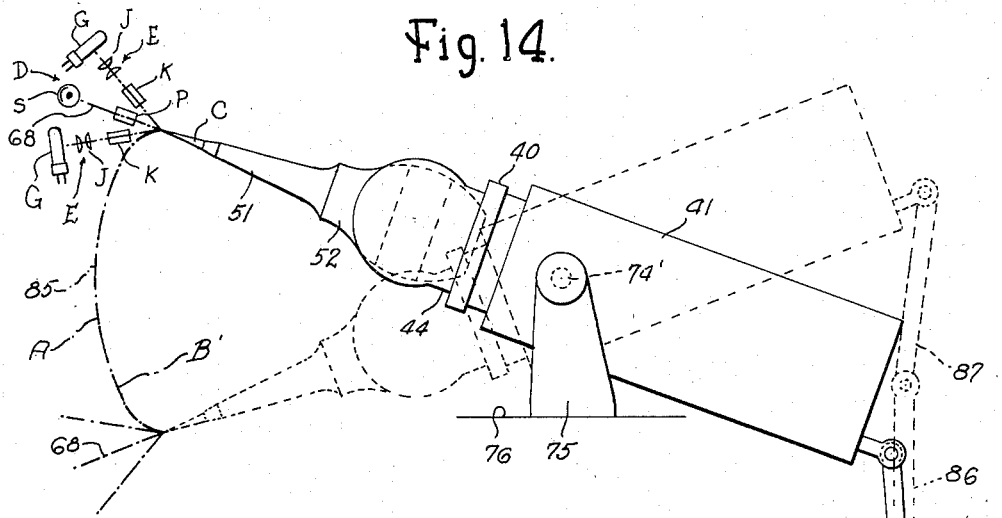
Figure 14 is a semi-diagrammatic view of a slightly modified form of construction.
Figure 15:
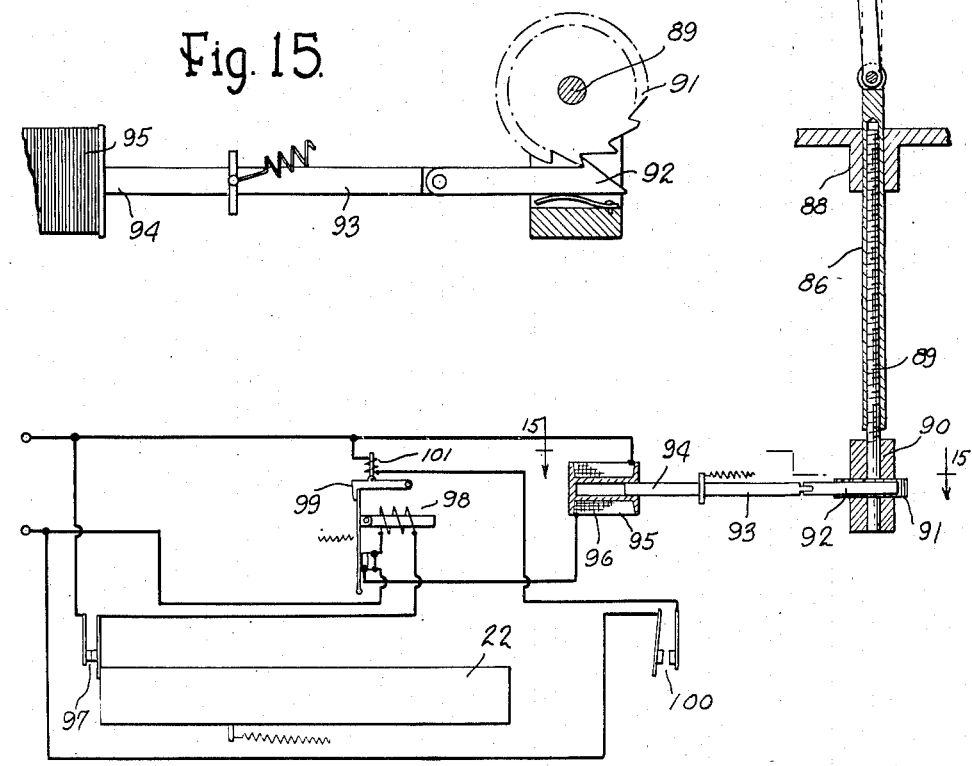
Figure 15 is a section taken substantially on the plane indicated by the line 15—15 of Figure 14.

In Figures 14 and 15, I have illustrated an arrangement particularly advantageous when duplicating arcuate surfaces of the general type designated by the reference character 85 in Figure 14. In order to accurately reproduce the arcuate surface 85 in the work blank B', the ram is automatically adjusted about the pins 74' in timed relation to movement of the traversing carriage 22. Upon particular reference to Figure 14, it will be noted that the outer end of the ram is connected to a nut 86 by means of a link 87 and the nut, in turn, is slidably supported in a bushing 88 fixed in any suitable manner to the machine frame. The nut threadedly engages a screw 89 having the lower end journalled in a bearing 90 and having a ratchet wheel 91 secured to the lower end. The teeth of the ratchet wheel are adapted to be successively engaged by a pawl 92 mounted upon the free end of an operating rod 93 having the opposite end secured to the armature 94 of an electromagnet 95. The arrangement is such that energization of the electromagnet 95 effects a movement of the armature 94 into the magnetic field and causes a corresponding movement of the rod 93 to impart a rotative movement to the ratchet wheel 91 throughout the extent of one tooth space. Rotation of the ratchet wheel 91 effects a corresponding rotation of the screw 89 relative to the nut 86 and imparts an upward movement to the nut 86. As a result, the head 44 of the ram is moved downwardly one increment from the position thereof shown in Figure 14 and this operation continues until the ram has assumed the dotted line position thereof shown in this figure. It follows from the above that the optical unit is not only maintained at the most advantageous angle with respect to the arcuate or rounded surface of the model throughout the scanning operation, but the tool C is maintained in such a position with respect to the work blank as to insure obtaining the proper cut.

It will, of course, be understood that adjustment of the ram is effected at the end of the traversing movement of the carriage 22 and in order to accomplish this result, the circuit through the load coil 96 of the electromagnet 95 is controlled by a switch 97 positioned in the path of travel of the carriage 22. As shown in Figure 14, the switch 97 is so located with respect to the path of travel of the carriage 22 that when the latter has been advanced to the end of its traversing stroke, it engages the switch 97 and closes the same. Closing of the switch 97 operates a relay 98 to, in turn, close a circuit through the load coil 96 and this latter circuit is maintained closed by a suitable latch 99 engageable with the free end of the armature of the relay in the manner shown in Figure 14. As the carriage 22 is moved in the opposite direction to its initial starting position, the same engages a second switch 100 to close a circuit through a solenoid 101 and thereby disengage the latch 99 from the relay 98 permitting the latter relay to move to its open position wherein the circuit to the load coil 96 of the electromagnet is de-energized. Thus, it will be noted that at the end of each traversing stroke of the carriage 22, the ram is swung one increment of travel from the full line position thereof shown in Figure 14 toward the dotted line position thereof illustrated in the same figure.

In connection with the embodiment of the invention illustrated in Figures 1 to 13, inclusive, reference was made to the fact that the work support and the pattern support are oscillatable about their respective vertical axes. This arrangement is particularly advantageous in cases where the opposite vertical sides of the model are arcuate or extend at a substantial angle with respect to the adjacent surface. However, in the embodiment of the invention illustrated in Figures 14 and 15, the opposite substantially flat sides of the model are not scanned by the optical system and, therefore, the oscillatory movement previously referred to may be dispensed with.

As hereinbefore stated, the machine previously described is particularly designed for forming cavities in the work blank having surfaces corresponding exactly to the surface of the model. In some instances, it may be desirable to form an exact replica of the model in the work blank and this may be readily accomplished with the present machine by merely changing the position of the optical unit from a position at the outer side of the model to a position at the inner side of the model. This latter position of the optical system is shown in Figure 16 and is accomplished by removing the arm 50 from the head 44 of the ram and replacing the same with a relatively shorter arm 102. This is the only change necessary in the machine to render the same operable to cut an exact replica of the model in the work blank. Otherwise, the machine operates in exactly the same manner previously described.

What I claim as my invention is:

1. In a reproducing machine, supporting means for a work blank and for a model having a surface to be reproduced in the work blank, a ram mounted for reciprocation toward and away from the supporting means, an optical system carried by the ram in a position opposite the model, a tool also carried by the ram in a position opposite the work blank, said optical system having means for projecting a beam of radiant energy on the surface of the model to be reproduced and having a light sensitive cell responsive to the flux of radiant energy reflected from the surface to control reciprocation of the ram, and means pivotally supporting the ram for swinging movement to provide for locating the optical unit and tool in different angular positions with respect to the model and work blank respectively.

2. In a reproducing machine, supporting means for a work blank and for a model having a surface to be reproduced in the work blank, a ram mounted for reciprocation toward and away from the supporting means, an optical system carried by the ram in a position opposite the model, a tool also carried by the ram in a position opposite the work blank, said optical system having means for projecting a beam of radiant energy on the surface of the model to be reproduced and having a light sensitive cell responsive to the flux of radiant energy reflected from the surface to control reciprocation of the ram, and means mounting the ram for tilting movement about an axis extending transversely to the axis of reciprocation of the ram to provide for locating both the optical system and tool in different angular positions with respect to the model and work blank, and means for securing the ram in any one of several tilted positions thereof.

3. In a reproducing machine, supporting means for a work blank and for a model having a surface to be reproduced in the work blank, a ram mounted for reciprocation toward and away from the supporting means, means establishing communication between the ram and a source of fluid under pressure including a valve, an optical system carried by the ram opposite the model, a tool also carried by the ram and positioned opposite the work blank, said optical system having means for projecting a beam of radiant energy on the surface of the model and having a light sensitive cell responsive to variations in flux of the radiant energy reflected from the surface of the model to control the operation of the valve, and means supporting the ram for tilting movement about an axis extending transversely to the axis of reciprocation thereof to provide for locating the optical system and tool in different angular positions with respect to the model and work blank.

4. In a reproducing machine, a support for a model having a surface to be reproduced, an optical system for scanning the surface, means for relatively moving the model support and optical system in directions to provide for traversing the surface by the optical system, a mounting for the optical system providing for adjustment of the system to different angular positions with respect to the model, and means operated by the means aforesaid at the end of each traversing movement to move the optical system to a different angular position with respect to said model.

5. In a reproducing machine, a support for a model having a surface to be reproduced, a ram mounted for reciprocation toward and away from the model, an optical system carried by the ram in a position opposite the surface of the model, said optical system having means for projecting a beam of radiant energy on the surface of the model and having a light sensitive cell responsive to the flux of radiant energy reflected from the surface of the model to control reciprocation of the ram, means for moving the model support in one direction relative to the ram to provide for traversing the surface of the model by the optical system, means pivotally mounting the ram for swinging movement about an axis extending transversely to the path of reciprocation of the ram to provide for locating the optical system in different angular positions with respect to the surface of the model, and means operating in timed relation to the traversing means for swinging the ram about the pivotal support therefor.

6. In a reproducing machine, supporting means for a work blank and for a model having a surface to be reproduced in the work blank, a ram mounted for reciprocation toward and away from the supporting means, an optical system carried by the ram opposite the model, a tool also carried by the ram and positioned opposite the work blank, said optical system having means for projecting a ray of radiant energy on the surface of the model and having a light sensitive cell responsive to the flux of radiant energy reflected from the model to control reciprocation of the ram, means for moving the supporting means relative to the ram to effect traversing of the model and work blank by the optical system and tool respectively, means supporting the ram intermediate the ends thereof for swinging movement to provide for locating the optical system and tool in different angular positions with respect to the model and work blank, and means operating in timed relation to the traversing means to swing the ram about its pivotal support.

7. In a reproducing machine, a support for a model having a surface to be reproduced, a ram mounted for reciprocation toward and away from the model, an optical system carried by the ram in a position opposite the surface of the model, said optical system having means for projecting a beam of radiant energy on the surface of the model and having a light sensitive cell responsive to the flux of radiant energy reflected from the surface of the model to control reciprocation of the ram, means for moving the model support in one direction relative to the ram to provide for traversing the surface of the model by the optical system, means pivotally mounting the ram for swinging movement about an axis extending transversely to the path of reciprocation of the ram to provide for locating the optical system in different angular positions with respect to the surface of the model, and means operating in timed relation to the traversing means to swing the ram by a step by step movement throughout a predetermined range of angular travel.

8. In a reproducing machine, supporting means for a work blank and for a model having a surface to be reproduced in the work blank, a ram mounted for reciprocation toward and away from the supporting means, an optical system carried by the ram opposite the model, a tool also carried by the ram and positioned opposite the work blank, said optical system having means for projecting a ray of radiant energy on the surface of the model and having a light sensitive cell responsive to the flux of radiant energy reflected from the model to control reciprocation of the ram, means for moving the supporting means relative to the ram to effect traversing of the model and work blank by the optical system and tool respectively, means supporting the ram intermediate the ends thereof for swinging movement to provide for locating the optical system and tool in different angular positions with respect to the model and work blank, and means operated by the traversing means at the end of each traversing movement to tilt the ram throughout a predetermined distance of angular travel about the pivotal mounting of the ram.

9. In a reproducing machine, a support for a model having a surface to be reproduced, an optical unit positioned opposite said surface, means for relatively moving the optical system and model toward and away from each other in dependence upon variations in the contour of the surface of the model, said optical system having provision for casting a beam of radiant energy on said surface of the model and having a light sensitive cell responsive to the flux of radiant energy reflected from said surface to control the operation of the means aforesaid, means for relatively moving the optical system and model in directions to traverse said surface with the beam of radiant energy, and means operating at the end of each traversing movement for relatively angularly adjusting the position of the optical system and support to maintain the beam of radiant energy substantially normal to the surface of the pattern to be reproduced.

10. In a reproducing machine, supporting means for a work blank and for a model, a tool support carrying a tool in a position opposite the work blank, an optical system positioned opposite a surface of the model to be reproduced, means for relatively moving the optical system and model toward and away from each other and for also effecting a relative movement of the tool and work blank toward and away from each other, said optical system having provision for casting a beam of radiant energy on the surface of the model and having a light sensitive cell responsive to the flux of radiant energy reflected from the surface to control the operation of the means aforesaid, means for relatively moving the optical system and model in directions to traverse said surface with the beam of radiant energy and for effecting a corresponding traversing movement between the tool and work blank, and means operated by the traversing means for angularly adjusting the optical system and tool relative to the model and work blank to maintain the beam of radiant energy substantially normal to the surface of the pattern to be reproduced and to maintain the tool in a corresponding position with respect to the adjacent surface of the work blank.

11. In a reproducing machine, supporting means for a work blank and for a model, a ram mounted for reciprocation toward and away from the supporting means, a tool carried by the ram and positioned opposite the work blank, an optical system also carried by the ram and positioned opposite the model, said optical system having means for projecting a beam of radiant energy on the surface of the model and having a light sensitive cell provided with an aperture intersecting one edge of the image projected on the model by the beam of radiant energy, means controlled by the flux of the radiant energy escaping through the aperture for moving the ram toward and away from the supporting means to maintain the aperture in intersecting relationship with the edge of the image aforesaid, and means for angularly adjusting the ram relative to the supporting means to maintain the beam of radiant energy substantially normal to the surface of the pattern scanned by the beam and to maintain the tool in the same relative position with respect to the adjacent surface of the work blank.

12. In a reproducing machine, supporting means for a work blank and for a model, a ram mounted for reciprocation toward and away from the supporting means, a tool carried by the ram and positioned opposite the work blank, an optical system also carried by the ram and positioned opposite the model, said optical system having means for projecting a beam of radiant energy on the surface of the model and having a light sensitive cell provided with an aperture intersecting one edge of the image projected on the model by the beam of radiant energy, means controlled by the flux of the radiant energy escaping through the aperture for moving the ram toward and away from the supporting means to maintain the aperture in intersecting relationship with the edge of the image aforesaid, means for relatively moving the supporting means and ram in directions to cause the beam of radiant energy to traverse the surface of the model and to effect a corresponding traversing movement of the tool relative to the work blank, and means operating in timed relation to the traversing means for angularly adjusting the ram to maintain the beam of radiant energy substantially normal to the surface of the pattern scanned and to maintain the tool in a corresponding position with respect to the adjacent surface of the work blank.

13. In a reproducing machine, a support for a model having a surface to be reproduced, an optical system for scanning said surface, said optical system having a plurality of light projectors supported in such angular relationship that the beams of radiant energy emitting therefrom intersect each other at the surface of the model and also have a light sensitive cell responsive to the flux of radiant energy reflected from said surface, and means for angularly adjusting the optical system with respect to said surface to position at least one of the light beams of radiant energy normal to said surface.

14. In a reproducing machine, a support for a model having a surface to be reproduced, an optical system positioned opposite said surface, means for relatively moving the optical system and model toward and away from each other in dependence upon variations in contour of said surface, said optical system having a pair of light projectors supported in a common plane in such angular relationship that the beams of radiant energy emitting therefrom intersect at the surface of the model and also having a light sensitive cell responsive to the flux of the radiant energy reflected from said surface to control the operation of the means aforesaid, and means for angularly adjusting the optical system relative to the model to position one or the other of the light beams of radiant energy normal to said surface.

15. In a reproducing machine, supporting means for a work blank and for a model, a tool supported opposite the work blank, an optical system supported opposite the model, means for relatively moving the optical system and model toward and away from each other and for also effecting a relative movement of the tool and work blank toward and away from each other, said optical system having a pair of light projectors supported in a common plane in such angular relationship that the beams of radiant energy emitting therefrom intersect at the surface of the model and also having a light sensitive cell responsive to the flux of radiant energy reflected from said surface to control the operation of the means aforesaid, means for relatively moving the optical system and model in directions to traverse said surface with the beams of radiant energy and to also traverse the surface of the work blank with the tool, and means operating in timed relation to the traversing means for angularly adjusting the optical system and tool to maintain one or the other of the beams of radiant energy normal to the surface of the model and to maintain the tool in a corresponding position with respect to the work blank.

16. In a reproducing machine, supporting means for a work blank and for a model, a tool positioned opposite the work blank, a unit for tracing the surface of the model to be reproduced in the work blank, means controlled by the tracer unit in accordance with variations in contour of said model surface for relatively moving the work blank and tool toward and away from each other, means for relatively moving the model and tracing unit in directions to provide for traversing the surface of the model by the tracing unit and for also effecting relative movement of the work blank and tool to provide for traversing the adjacent surface of the work blank with the tool, a mounting for the tracing unit and tool providing for adjustment of both the tracing unit and tool to different angular positions with respect to the model and work blank respectively, and means operated by the traversing means at the end of each traversing movement to adjust the tracing unit and tool to different angular positions with respect to the model and work respectively.

17. In a reproducing machine, supporting means for a work blank and for a model, a ram mounted for reciprocation toward and away from the supporting means, a tool mounted on the ram in a position opposite the work blank, a unit for tracing the model carried by the ram opposite the model and responsive to variations in contour of the model to effect a movement of the ram toward and away from the supporting means, means for relatively moving the supporting means and ram in directions to cause the model and work blank to be traversed by the tracer unit and tool respectively, and means for angularly adjusting the ram relative to the supporting means to maintain the model tracing means substantially normal to the surface of the model traced and to also maintain the tool in a corresponding position relative to the work blank.

18. In a reproducing machine, a support for a model having a surface to be reproduced, a unit for tracing the surface of the model to be reproduced, means for relatively moving the model and tracing unit in directions to provide for traversing the surface of the model by the tracing unit, a mounting for the tracing unit angularly adjustable to locate the tracing unit at different angular positions with respect to the model, and means operated by the tracing means to angularly adjust said mounting and thereby move the tracing means to different angular positions with respect to the model.

19. In a reproducing machine, supporting means for a work blank and for a model, a tool positioned opposite the work blank, a unit for tracing the surface of the model to be reproduced and positioned opposite said model, means controlled by the tracer unit in accordance with variations in contour of the model surface for relatively moving the work blank and tool toward and away from each other, means for relatively moving the model and tracing unit in directions to provide for traversing the surface of the model by the tracing unit and for also effecting relative movement of the work blank and tool to provide for traversing the adjacent surface of the work blank with the tool, a mounting for the tracing unit and tool, and means pivotally supporting the mounting for swinging movement in directions to provide for locating the tracing unit and tool in different angular positions with respect to the model and work blank respectively.

EVERETT J. COOK.